United States Patent [19]
Hughes

[11] 3,787,851
[45] Jan. 22, 1974

[54] LOW PRF PULSE DOPPLER RADAR HAVING LOW SPEED GROUND MOVING TARGET REJECTION

[75] Inventor: Robert B. Hughes, College Park, Md.

[73] Assignee: Westinghouse Electric Corporation, Pittsburgh, Pa.

[22] Filed: Dec. 13, 1971

[21] Appl. No.: 207,253

[52] U.S. Cl. ............................ 343/7.7, 343/17.1 PF
[51] Int. Cl. .............................................. G01s 9/42
[58] Field of Search .............. 343/7.7, 17.1 PF, 17.2

[56] References Cited
UNITED STATES PATENTS

| | | | |
|---|---|---|---|
| 3,631,489 | 12/1971 | Cooper | 343/7.7 |
| 3,417,396 | 12/1968 | Stifter et al. | 343/17.1 PF |
| 3,588,898 | 6/1971 | Watters et al. | 343/17.1 PF |

Primary Examiner—Benjamin A. Borchelt
Assistant Examiner—G. E. Montone
Attorney, Agent, or Firm—F. H. Henson et al.

[57] ABSTRACT

An AMTI radar in which the transmitted pulse train is comprised of multiple PRFs which are sequentially switched in a predetermined order during a target dwell time. A digital MTI comb or notch filter having a controlled reject and pass band characteristic for each PRF is utilized such that when operating in one of the lower PRFs, a wide notch characteristic is used for a time after radar pulse transmission during the interval which will provide unambiguous range for the highest PRF, i.e. during the interpulse interval of the highest PRF. Then a narrower notch characteristic is used for the remainder of the interpulse period of the instant PRF. A composite notch filter characteristic is thus obtained for all of the PRFs during a specific target dwell time which will reject not only ground clutter, but also low speed ground moving targets while passing relatively high speed airborne target returns during at least one of the PRFs.

11 Claims, 7 Drawing Figures

WIDE NOTCH

NARROW NOTCH

LOW PRF PULSE DOPPLER RADAR HAVING LOW SPEED GROUND MOVING TARGET REJECTION

BACKGROUND OF THE INVENTION

1. Field of the Invention

This invention relates generally to coherent pulse Doppler radar systems and more particularly to a low PRF Doppler radar which exhibits ambiguous Doppler, unambiguous range, commonly referred to as an AMTI system. The purpose of this invention is to reduce all main beam, ground return clutter and low speed ground target returns below a predetermined threshold level.

2. Description of the Prior Art

Low PRF pulse Dopper (AMTI) radars are capable of detecting and tracking targets in a downlook operating mode where the target return is time coincident with heavy ground clutter. This capability is realized by discriminating against stationary ground return in the frequency domain while accepting returns from moving targets whose Doppler frequencies differ from the Doppler frequency of the stationary ground clutter. The characteristic feature of such a radar is that the transmitted signal must be coherent with the reference signal in the receiver. Such systems are generally disclosed in the "Introduction to Radar Systems," by Skolnik, published by McGraw-Hill (1962).

To be unambiguous, the return pulse reflected from the target must occur between the first and second pulse transmitted from the radar. Moreover, in a high speed aircraft radar platform, the clutter return spectrum spreads due to the Doppler shift caused by the relative velocity. This clutter spread could be overcome by the use of a relatively high PRF: however, this gives rise to ambiguous range information at long ranges due to the fact that the radar return signal would be received after a subsequent transmitted pulse. Therefore, in order to provide long unambiguous range operation a relatively low PRF must be utilized. A characteristic of such a radar, however, is that it is unable to determine unambiguously the velocity of detected targets based on Doppler information. This characteristic has been found to be detrimental when searching for airborne targets where relatively slower moving surface vehicles are also encountered. A related effect resulting from Doppler ambiguous PRF is referred to as "blind speeds" and has been overcome in the prior art by means of utilizing staggered pulse repetition frequencies such as disclosed in U.S. Pat. No. 3,480,953 issued to J. S. Shreve and U.S. Pat. No. 3,491,360 issued to W. Stoorvogel.

Another solution to the problem is to utilize very wide clutter rejection filters which not only reject stationary ground clutter, but also the Doppler frequencies associated with low velocity surface vehicles. Such a system might comprise the teachings of U.S. Pat. No. 3,267,468 issued to K. S. Stull, Jr. This approach, however, has two direct consequences, one of which is it imposes the need for higher PRFs than would otherwise be used since a rejection band wide enough for typical surface traffic would occupy the entire intra-PRF Doppler interval and secondly the wide reject band aggravates the low PRF pulse Doppler "blind speed" problem.

Accordingly, the present invention discloses means for providing desired surface vehicle rejection while at the same time extending unambiguous range information for relatively high speed aircraft targets.

SUMMARY

Briefly, the subject invention comprises a low PRF pulse Doppler radar system including means for providing a plurality of PRFs switched sequentially in a predetermined order during a target dwell time Additionally, the invention includes a controlled digital notched filter coupled to the receiver portion of the radar whose filter characteristic is varied in time relationship with each PRF. In each filter characteristic, there is a reject band of either $\pm 1\frac{1}{2}$ or $\pm\frac{3}{4}$ normalized frequency units about each PRF harmonic and the notch characteristic is switched during the PRF sequence so that a wide notch characteristic ($\pm 1\frac{1}{2}$ frequency unit reject band) is used during the first part of the interpulse interval of each PRF equalling the period of the selected higher or highest PRF utilized and then switching to a narrow notch characteristic ($\pm\frac{3}{4}$ frequency unit reject band) for the remainder of the respective interpulse interval for all the lower PRFs. A notch switching time selector circuit and a notch width switching control circuit are coupled between the filter and PRF generator for controlling appropriate filter characteristic in response to the PRF sequence. By making the reject band $\pm 1\frac{1}{2}$ frequency units about each PRF harmonic for short range and $\pm\frac{3}{4}$ frequency units for long range while utilizing a plurality of PRFs, a desired ground target rejection band is provided which provides assured visibility of relatively high speed (large Doppler) airborne targets in at least one of the PRFs.

DESCRIPTION OF THE PREFERRED EMBODIMENT

Figure 1A:
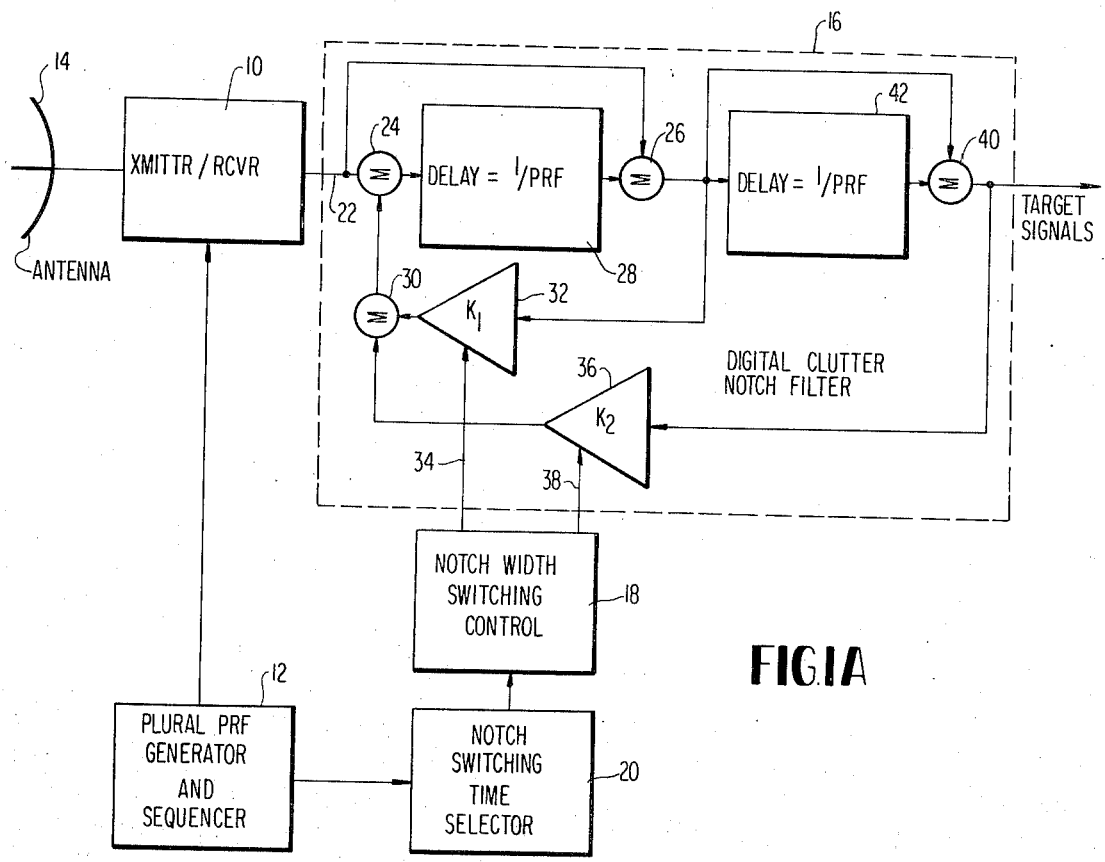
FIG. 1A is a block diagram illustrative of the preferred embodiment of the subject invention.

Referring now to the drawings and more particularly to FIG. 1A, reference numeral 10 generally refers to the transmitter/receiver section of a typical airborne, low PRF pulsed Doppler radar. As is well known to those skilled in the art such a radar system is a coherent system in which the transmitted signal is coherent, that is in phase with the reference signal in the receiver. The transmitter portion may be comprised of a microwave stabilized locked oscillator (STALO) not shown triggered by means of a pulse train from a PRF generator 12 controlled by a synchronizer, not shown. The STALO normally provides an output pulse of carrier frequency $f_0$ which is applied to a radiant antenna 14 through a gated amplifier and duplexer, also not shown. A STALO normally provides a second output of reduced amplitude and a frequency $f_0 \pm f_{if}$ which is applied to a mixer whose other input comprises the radar return pulse $f_0$ received at the antenna and fed thereto through the duplexer. The mixer then provides a coherent IF signal of the radar return pulse at a frequency $f_{if}$.

Figure 1B:
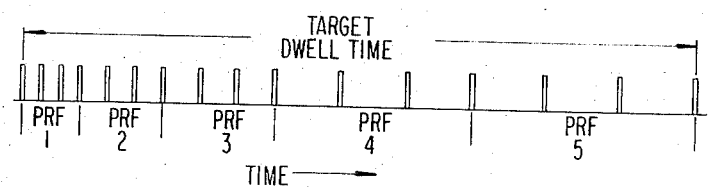
FIG. 1B is a pulse diagram of a plurality of transmitted radar pulses having different PRFs transmitted during a target dwell time.
Figure 3A:
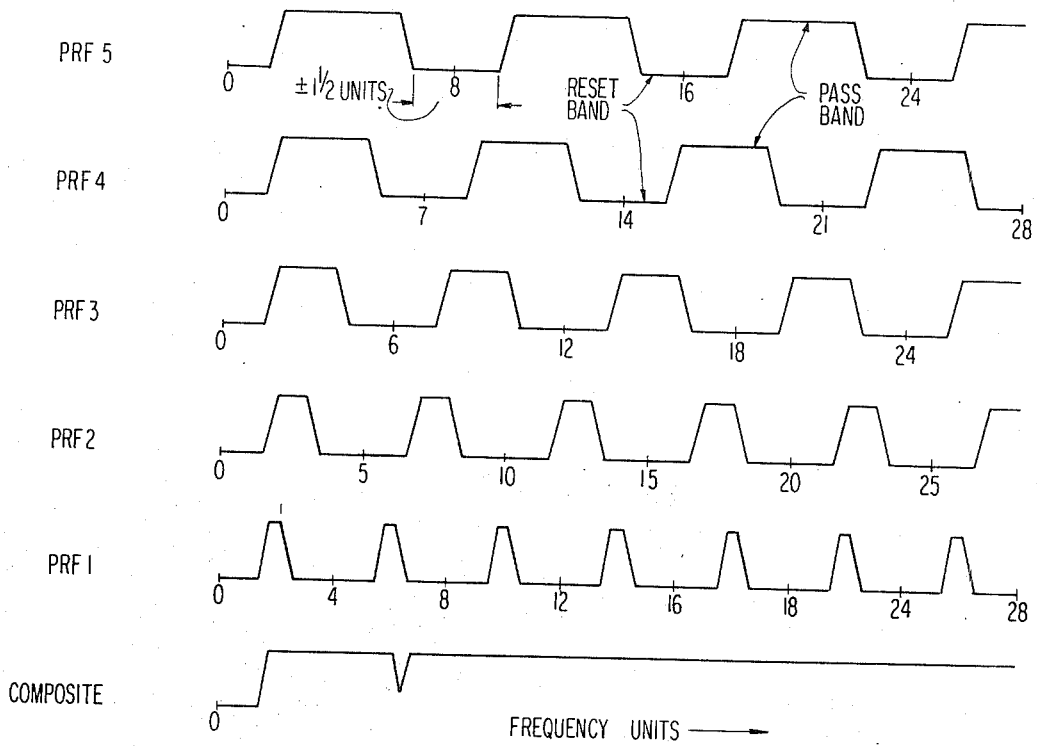
FIG. 3A is a set of waveforms illustrative of a wide notch comb filter characteristic having a reject band of $\pm 1\frac{1}{2}$ normalized frequency units about each PRF harmonic.
Figure 3B:
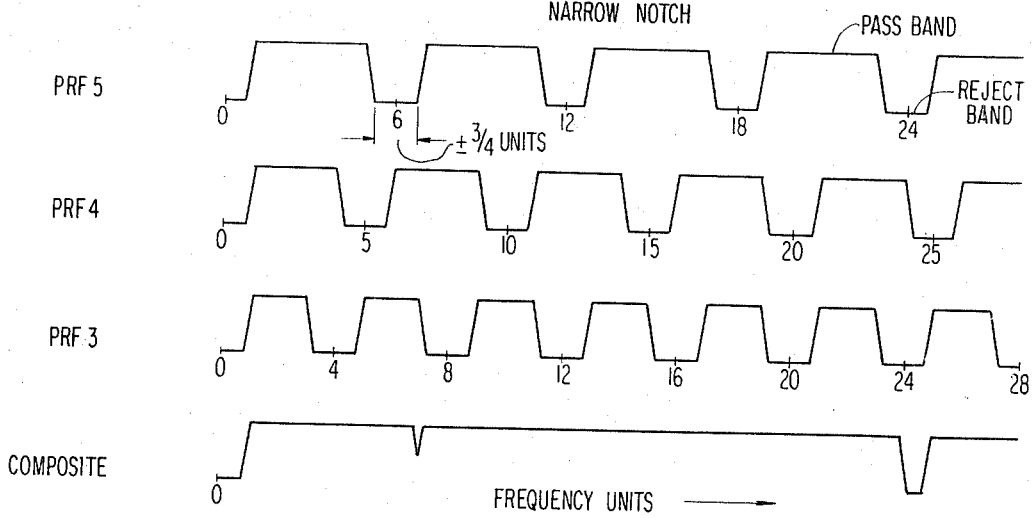
FIG. 3B is a set of waveform illustrative of a narrow notch comb filter characteristic wherein each filter has a reject band of $\pm\frac{3}{4}$ normalized frequency units about each PRF harmonic.

In the present invention the PRF generator 12 sequentially generates groups of triggering pulses with each group respectively having a PRF which is different from the group which precedes it. This pulse train causes the transmitter portion of the radar to generate radar output pulses whose PRF is sequentially varied in a predetermined order, e.g. going from a relatively high PRF to a relatively low PRF during a target dwell time such as shown in FIG. 1B. In the specific illustrative example, pulses of five succesively decreasing PRFs are radiated from the radar antenna 14 during the target dwell time. The target dwell time is defined as the time it takes the antenna 14 to scan the target of interest. The reflected target return is picked up by the antenna 14, fed through the receiver portion of the transmitter/receiver section 10 such as by means of a duplexer and first mixer, not shown, which is then fed to a digital clutter notched comb filter 16 which has a variable externally controlled filter characteristic such as shown in FIGS. 3A and 3B. The filter characteristic is selectively varied in passband as well as the reject band for each PRF as the plural or multiple PRFs are sequenced. The notch or reject bandwidth of the filter characteristic is controllable between at least two reject bandwidths or notches. This is accomplished by means of a notch width switching control circuit 18 coupled to a notch switching time selector 20 which is responsive to the PRF sequence produced by the PRF generator and sequencer 12.

Figure 2:
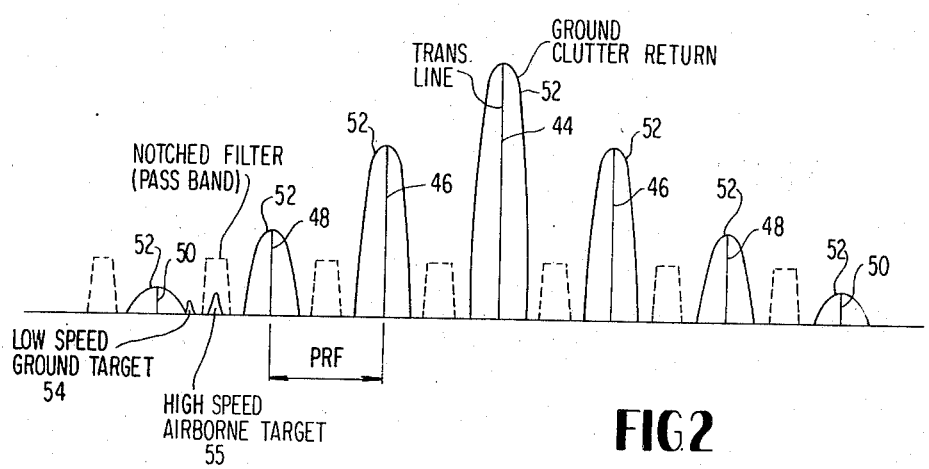
FIG. 2 illustrates the frequency spectrum of the system operating at one of the plurality of PRFs and the corresponding notched filter characteristic utilized therewith.

The digital clutter notch filter circuit 16 is a two pole recursive filter having two adjustable feedback constants K1 and K2. An IF signal corresponding to a target return, having a frequency spectrum for a particular PRF as shown in FIG. 2, is fed by means of a signal path 22 to one input of a first and second signal summer 24 and 26, respectively. The second summer 26 receives as its other input the output of a first time delay circuit 28 which has a delay of 1/PRF. The input of the first time delay circuit 28 comprises the output of the first summer 24. The first summer 24, on the other hand, receives as its other input the output of a third summer 30. One input of summer 30 is the output of the second summer 26 fed through a feedback amplifier 32 which has its gain $K_1$ controlled by means of a control signal feed thereto from the notch width switching control circuit 20 over signal elad 34. The other input to the summer 30 is from a second feedback amplifier 36 whose gain $K_2$ is also adjustable by means of a signal coupled from the notch width switching control circuit 20 over signal path 38. The second feedback amplifier 36 receives its input from the output of a fourth summer 40 which receives one input directly from the second summer 26 and the output of a second time delay circuit 42 also having a time delay of 1/PRF. The input of the time delay circuit 42 is coupled to the output of the second summer 26.

The digital clutter notch filter is controlled as a function of the PRF sequence to generate a filter characteristic which includes a desired ground target rejection band as well as the ground clutter return for each PRF. In this regard reference to FIG. 2 illustrates the desired characteristic. As is well known in pulse Doppler radar technology, the frequency spectrum of the return pulse includes the transmitted spectral line 44 as well as spectral lines 46, 48, 50, etc. which correspond to the harmonics of the transmitted carrier frequency respectively separated by the instant PRF frequency. Where the radar is mounted on a moving platform, such as a high speed aircraft, the received ground clutter spectra undergoes a Doppler shift or spread as shown by the spectral cusps 52 which are symmetrically dispersed around the spectral lines 44, 46, 48 and 50. Any moving targets however will display a spectral cusp such as 54 or 55 shifted outside of the ground clutter because of the increased Doppler shift due to the relative movement between the target and the radar platform. Accordingly, a low speed ground target 54 would appear in the spectrum as a cusp 54 adjacent the ground clutter spectra whereas a high speed target spectral cusp 55 would be shifted even further. It can be seen, therefore, that by proper selection of a notch filter characteristic, the reject band can be made to include the ground clutter spectrum as well as the relatively low speed target spectra as well while allowing the desired high speed target spectra to fall within the pass band. A detailed description of a multiple delay notch filter such as used in the present invention is set forth in Chapter 9 of Radar Design Principles, Fred E. Nathanson, McGraw-Hill, 1964.

Referring now to FIGS. 3A and 3B, there is disclosed in FIG. 3A a wideband notch characteristic generated by the filter 16 for five PRFs wherein PRF 1 is the lowest PRF utilized while PRF 5 is the highest PRF. It is significant to note that when the wide notch characteristic is selected by means of the switching control circuit 20, a reject band of $\pm 1\frac{1}{2}$ normalized frequency units is provided about each PRF harmonic which is the desired reject band to delete slow moving targets at relatively close range. It can be appreciated, however, that for the relatively lower PRFs for example PRF 1 and PRF 2 in FIG. 3A, which are utilized for unambiguous detection of targets at larger ranges, the ground clutter spectrum cusps 52 shown in FIG. 2 are closely spaced, thereby restricting the available passband when a wide notch is used to reject the lower speed target return which is undesirable. Since the clutter return spectrum for higher PRFs are relatively widely spaced, the wide notch characteristic is acceptable; however, where long unambiguous range determination is to be made, and the relatively lower PRFs utilized therefor, it becomes desirable to narrow the reject band of the notch filter characteristic such as shown in FIG. 3B wherein the reject band of $\pm\frac{3}{4}$ normalized frequency units are utilized and provide a composite filter characteristics as shown. While the composite filter characteristics in both the wide notch and narrow notch mode display a break in the passband, this can be overcome by the utilization of additional PRFs. For this reason, the number of PRFs utilized is shown for the purposes of illustration only and is not meant to be considered in a limiting sense. As the PRFs are sequenced, visibility of a high speed airborne target will be provided by the return appearing in the passband of at least one of the PRFs. Additionally, a spread of PRF frequency from four to eight normalized frequency units is utilized to assure good visibility of the desired targets.

Figure 4:
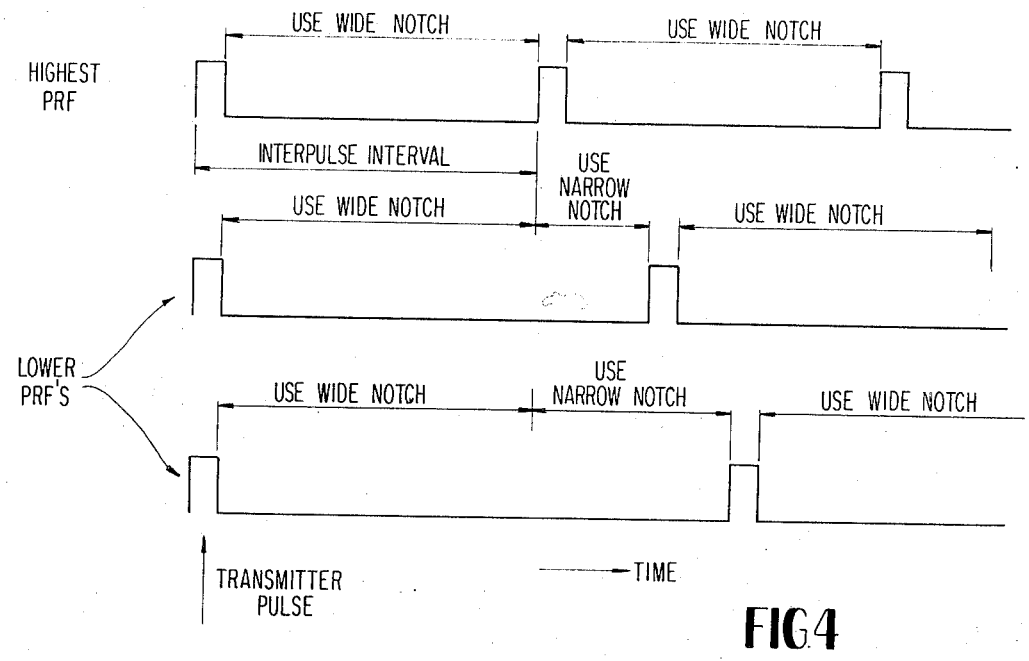
FIG. 4 is a set of waveforms illustrative of the switched notch filter characteristic provided in relation to the PRFs utilized.

The notch switching time selector 18 and the notch width switching control circuit 20 in the subject invention operate to control the filter characteristics as shown in FIGS. 3A and 3B during the interval between transmitted pulses while the PRF sequence occurs. FIG. 4 discloses that for a selected one, i.e. the highest PRF, such as PRF 1, the wide notch characterstic such as shown in FIG. 3A is used. However, for selected lower PRFs for example PRFs 3, 4 and 5, as shown in FIG. 3B, the narrow notch characteristic is switched thereto after a time during the subject interpulse interval which is substantially equal to the period between pulses occurring at the highest PRF. Thus rejection notches are switched during the interpulse interval for the lower PRFs occurring during a target dwell time so as to reduce the rejection band as range increases.

Figure 5:
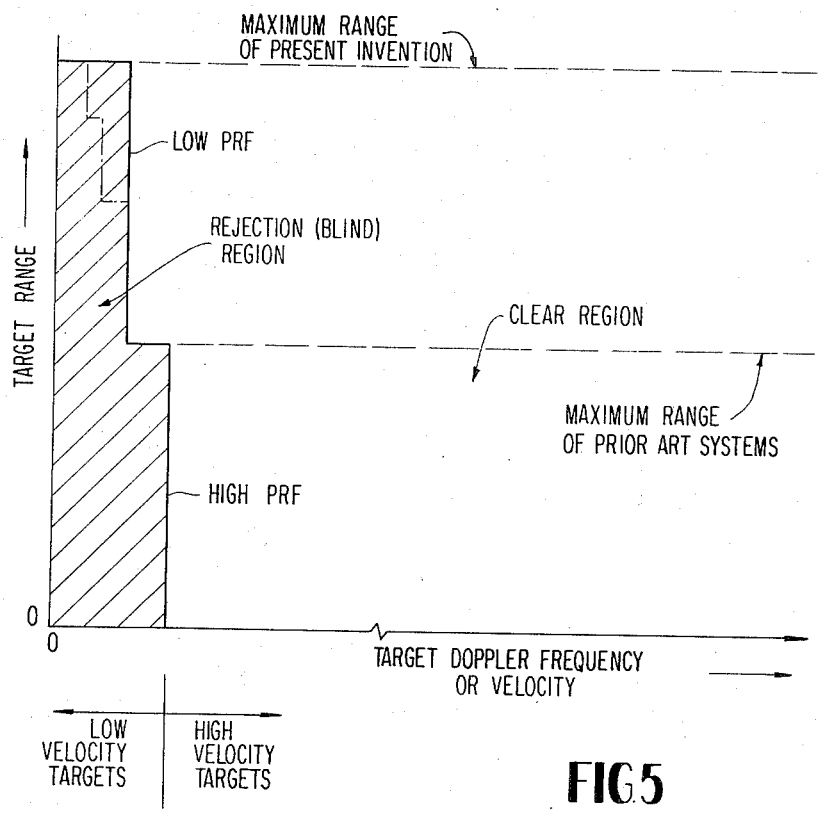
FIG. 5 is a graph illustrative of the range capability of the present invention in relation to prior art systems.

FIG. 5 discloses a graph which is illustrative of the system capability of a low PRF pulse Doppler radar having but one rejection band notch characteristic as opposed to the present invention which has at least two rejection band notch characteristics wherein the wide notch characteristic is initially used but the narrow notch characteristic is switched into the system during the interpulse interval for the low PRFs utilized. FIG. 5 additionally discloses in the dotted line portion of the rejection region the capability which would be obtained where four notch characteristics each of a decreasing notch characteristic is switched into the system as the PRF is lowered.

What has been shown and described, therefore, is a low PRF pulse Dopplar radar configured with a plurality of PRFs which are switched during a target dwell time. The comb or notch filter characteristic associated with each PRF is controlled to have a desired Doppler rejection band which includes relatively low speed targets as opposed to desired high speed targets. Additionally, a notch filter characteristic having a relatively narrower reject band is utilized with lower PRFs. When operating in one of the lower PRFs the wide notch filter is used for a time after pulse transmission corresponding to the unambiguous range of the highest PRF, that is the interpulse interval thereof, then the narrower notch characteristic is used for the remainder of the interpulse period for the other PRFs. Thus rejection notches are switched during the interpulse interval so as to reduce the rejection and as range increases. The significant advantage of the disclosed technique is that it approximately doubles the effective unambiguous range in the radar without affecting performance in the short range interval, the latter being provided by known prior art apparatus. Also, the use of current, digital filtering techniques permits the implementation of the disclosed concept without difficulty or significant complexity.

I claim as my invention:

1. In a pulse Doppler radar system including a transmitter and receiver section wherein said transmitter section is triggered from a pulse repetition frequency (PRF) generator that produces trigger pulses comprised of a plurality of PRFs which are sequentially switched in a predetermined order to produce a plurality of radar output pulses during each target dwell time, the improvement comprising:

an MTI filter circuit coupled to the receiver section, having a filter characteristic which is selectively variable and having at least two individually selected reject bands for each harmonic of said plurality of PRFs for rejecting both ground clutter return ignals and selected moving targets; and means coupled to said PRF generator and being responsive to said trigger pulses, said means being coupled to said filter generating and coupling signals thereto for controlling the filter characteristic in response to each PRF and selectively switching the reject band characteristic from one reject band to another during the sequence of said plurality of PRFs.

2. The invention as defined in claim 1 wherein said MTI filter comprises a notch filter and said means switches the filter characteristic from one reject band to another during the interpulse interval of at least one PRF.

3. The invention as defined by claim 2 wherein said at least one PRF comprises one of the lower PRFs.

4. The invention as defined by claim 3 wherein said notch filter circuit comprises a digital notch filter.

5. The invention as defined by claim 1 wherein said MTI filter comprises a notch filter having a wide notch reject band and a narrow notch reject band and wherein said means switches said filter characteristic from a wide notch reject band characteristic to the narrow notch reject band characteristic during the interpulse interval of at least one of the lower PRFs after a time substantially equal to the interpulse period of a higher PRF.

6. The invention as defined by claim 5 wherein said means switches the filter characteristic after a time substantially equal to the interpulse interval of the highest PRF.

7. The invention as defined by claim 1 wherein said plurality of PRFs have a frequency spectrum of at least four to eight normalized frequency units and wherein said at least two reject bands are comprised of substantially ±1½ normalized frequency units and ±¾ normalized frequency units respectively.

8. The invention as defined by claim 7 wherein said means switches the filter characteristic during the interpulse interval of at least one of the lower PRFs.

9. The invention as defined by claim 1 wherein said MTI filter comprises a digital notch filter including:

input circuit means coupled to said receiver section and accepting the IF signal of a radar return signal therefrom;

a first and a second signal summer each having two input ports and one output port and additionally including circuit means coupling said input circuit means to one port thereof;

a first time delay circuit coupled between the output port of said first signal summer and the other input port of said second signal summer;

a third signal summer having a pair of input ports and one output port;

a second time delay circuit coupled between the output port of said second signal summer and one input port of said third signal summer;

circuit means coupling the output port of said second signal summer to the other input port of said third signal summer;

a fourth signal summer having a pair of input ports and one output port;

first signal feedback circuit means coupled from the output port of said second signal summer to one input port of said fourth signal summer and additionally including circuit means coupled to said means controlling the filter characteristic whereby the feedback characteristic is controlled;

second feedback circuit means coupled from the output port of said third signal summer to the other input port of said fourth signal summer and including circuit means coupled to said means for controlling the filter characteristic whereby the feedback characteristic of said second feedback circuit means is controlled;

circuit means coupling the output port of said fourth signal summer to the other input port of said first signal summer; and output circuit means coupled to the output port of said third signal summer.

10. The invention as defined by claim 9 wherein said first and second time delay circuits have a time delay substantially equal to the interpulse interval of said plurality of pulse repetition frequencies.

11. The invention as defined by claim 10 wherein said first and second feedback circuit means comprises feedback amplifiers having the respective gain characteristic thereof controlled by said means controlling the filter characteristic.

* * * * *